United States Patent Office 2,875,194
Patented Feb. 24, 1959

2,875,194
DERIVATIVES OF 5-AMINO-D-RIBOFURANOSE

Bernard Randall Baker, Birmingham, Ala., and Henry Marcell Kissman, Nanuet, N. Y., assignors to American Cyanamid Company, New York, N. Y., a corporation of Maine No Drawing. Application October 5, 1955
Serial No. 538,810

20 Claims. (Cl. 260—211)

This invention relates to a new class of organic compounds. More particularly, this invention relates to the preparation of novel derivatives of 5-amino-D-ribofuranose.

The new compounds of this invention can be represented by the following general formula:

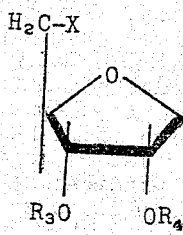

wherein X is a member of the group consisting of amino, phthalimido, succinimido, glutarimido and hexahydrophthalimido radicals; $R_3$ and $R_4$ are members of the group consisting of hydrogen, lower alkanoly radicals, aroyl radicals and the isopropylidene radical of the formula

when $R_3$ and $R_4$ are joined together; and $R_5$ is a member of the group consisting of halogen, lower alkoxy, hydroxyl, alkanoyloxy and aroyloxy radicals. As examples of suitable lower alkanoyl and aroyl radicals in the $R_3$ and $R_4$ positions there may be mentioned acetyl, propionyl, butyryl, benzoyl, p-chlorobenzoyl, p-methylbenzoyl radicals, etc. As examples of suitable alkanoyloxy and aroyloxy radicals in the $R_5$ position there may be mentioned acetyloxy, propionyloxy, butyryloxy, benzoyloxy, p-chlorobenzoyloxy, p-methylbenzoyloxy radicals, and the like. As examples of suitable lower alkoxy radicals in the $R_5$ position there may be mentioned methoxy, ethoxy, and the like.

The new compounds of this invention are useful as intermediates in the preparation of known compounds which have valuable therapeutic properties, such as, for example, the class of compounds generally referred to as aminodeoxyglycosidopurines which are active trypanosomicidal agents. These compounds, composed essentially of two moieties—a purine and a sugar, are described and claimed in the copending application of Baker et al., Ser. No. 405,236, filed January 20, 1954, now abandoned in favor of a continuation-in-part application Serial No. 544,084, filed October 31, 1955. The new compounds of this invention are also useful as intermediates in the preparation of compounds in which O-alkyl-L-tyrosine derivatives are reacted with the aminodeoxyglycosidopurines to yield compounds having antibacterial and amebacidal activity. The novel compounds may also be reacted with benzimidazoles and other heterocyclic compounds to produce compounds having valuable therapeutic properties.

For example, an aminodeoxyglycosidopurine containing a 5-aminoribose moiety may be prepared very conveniently from the compounds of the present invention. To accomplish this, one need only treat a tri-O-acylated aminodeoxy sugar, having its amino function suitably protected in the form of a cycloimido group, with a hydrogen halide in a suitable solvent such as ether. The resulting halo derivative may then be condensed directly with a derivative of a suitable purine such as the chloromercuri derivative of 6-dimethylaminopurine described in the aforesaid copending application. The resulting compound may then be unblocked with a suitable reagent, such as hydrazine hydrate, to produce the desired aminodeoxyglycosidopurine.

Although a variety of methods may be used by those skilled in the art to prepare the compounds of this invention, a particularly useful and novel method has been discovered and it is intended that this method also constitute a part of the present invention. According to our method, the 5-hydroxyl group of methyl 2,3-isopropylidene-D-ribofuranoside is activated by treatment with a suitable sulfonating agent such as tolylsulfonylchloride or methylsulfonylchloride in the presence of an inert organic solvent such as chloroform, dioxane, or dimethylformamide in the presence of an acid acceptor such as pyridine or trimethylamine. The methanesulfonate derivative is preferred since it is produced in better yields, and the product is more readily purified.

Nitrogen may be introduced into the 5-position of the methyl sulfonate or tolylsulfonate derivatives of methyl 2,3-isopropylidene-D-ribofuranoside by either of two alternative methods: (1) The ribofuranoside may be reacted with ammonia, yielding a blocked 5-amino-D-ribofuranoside, the amino group of which may subsequently be blocked by forming a cycloimido group; or (2) a cycloimido group may be formed directly by reacting the blocked ribofuranoside with an alkali phthalimide, succinimide, etc.

By the first of these two alternatives, the methanesulfonate or toluenesulfonate derivative of methyl 2,3-isopropylidene-D-ribofuranoside is reacted with ammonia in the presence of a suitable solvent, with or without the use of superatmospheric pressure. Solvents which may be used for this purpose are: lower alkyl alcohols such as methyl alcohol, ethyl alcohol, or butyl alcohol; dioxane; dimethylformamide; methyl Cellosolve; ether, and the like. The reaction may also be carried out in the absence of a solvent, as for example, when liquid ammonia is used. The methyl 2,3-isopropylidene-5-amino-D-ribofuranoside methanesulfonate or toluenesulfonate thus obtained may be liberated from its salt upon treatment with a base such as sodium acetate, triethylamine, butylamine, or sodium carbonate. Such conversion may be accomplished equally as well with any of the well-known anion exchange resins, as for example, Amberlite IR 400, manufactured by the Rohm & Haas Co.; or Dowex 1, manufactured by the Dow Chemical Co. Either the liberated base, or more conveniently, the salt may be reacted with acyclic anhydride such as phthalic, succinic, glutaric, or hexahydrophthalic anhydrides, followed by cyclization, to yield a 5-cycloimido derivative of methyl 2,3-isopropylidene-D-ribofuranoside. When salt is so used, it is necessary to include an acid acceptor such as triethylamine or sodium acetate in the reaction with the cyclic anhydride.

By the second of these alternatives, the methanesulfonate or toluenesulfonate derivative of methyl 2,3-isopropylidene-D-ribofuranoside is reacted directly with an appropriate reagent such as an alkali metal, alkali earth metal, or heavy metal salt of phthalimide, succinimide, glutarimide, or hexahydrophthalimide to yield a 5-cycloimido derivative of methyl 2,3-isopropylidene-D-ribofuranoside. Suitable solvents for this reaction are any inert neutral organic solvents such as, for example, dimethylformamide, dioxane, dibutyl ether, acetone, and the like. The temperature during the reaction may be varied between 100 and 200° C., although the limits of 125–150° C. are preferred. Where no solvent is desired, the compounds may be reacted by simple fusion.

After the nitrogen is introduced into the 5-position and is suitably blocked, the 2,3-isopropylidene group and the 1-methoxy group may be removed by acidic hydrolysis. Variation of the hydrolytic conditions will permit at least the partial preferential hydrolysis of the 2,3-isopropylidene group.

These compounds, which may conveniently be referred to as 5-cycloimidoriboses are now acylated in the 1, 2, and 3 positions.

As suitable acylating agents for the purpose of this reaction, there may be mentioned acetic anhydride, benzoyl chloride, propionyl chloride, propionic anhydride, butyryl chloride, butyric anhydride, p-nitrobenzoyl chloride, and p-chlorobenzoyl chloride. As solvents, there may be used any inert liquids such as chloroform, dioxane, ethylene dichloride and similar solvents. Whenever any of these liquids are used as solvents in this reaction, an acid-acceptor such as pyridine, triethylamine or collidine must be added to the reaction mixture. Preferably, however, pyridine itself may be used in lieu of the liquids shown, since it serves two functions simultaneously, i. e. as a solvent and as an acid-acceptor. The reaction proceeds smoothly from a period of 1 to 24 hours, at temperatures varying between 0 and 50° C.

This results in the corresponding 1,2,3-triacyl-5-cycloimidoribofuranoses having the following general formula:

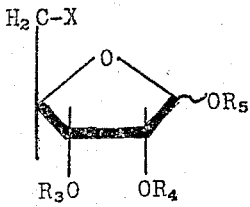

wherein X is a member of the group consisting of phthalimido, succinimido, glutarimido, and hexahydrophthalimido radicals and wherein $R_3$, $R_4$ and $R_5$ are members of the group consisting of lower alkanoyl and aroyl radicals as previously defined.

Although the 1,2,3-triacyl-5-cycloimidoribofuranoses, as defined above, are generally susceptible to attachment to purines as described in the aforesaid Baker et al. copending application, we have found that 1,2,3-triacyl-5-cycloimidoribofuranoses, as more particularly defined below, give superior yields when their 1-chloro derivatives are condensed with purines as described in the aforesaid copending application:

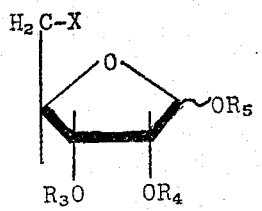

wherein X is a member of the group consisting of phthalimido and succinimido radicals, wherein $R_3$ and $R_4$ are benzoyl radicals and wherein $R_5$ is an acetyl radical.

In order to prepare compounds within the narrower definition above, a 1,2,3-tribenzoyl-5-cycloimido-D-ribofuranose is allowed to react with a hydrogen halide in a suitable solvent such as acetic acid, ether, or dioxane to give a 1-halo-2,3-dibenzoyl-5-cycloimido-D-ribofuranose. This product is converted to a 2,3-dibenzoyl-5-cycloimido-D-ribofuranose with silver carbonate in a water-containing solvent such as aqueous acetone, dioxane, or 2,3-dimethoxyethane. The 2,3-dibenzoyl-5-cycloimido-D-ribofuranose, finally, is acetylated as described hereinbefore.

The following examples are intended to illustrate the specific compounds embraced by this invention and the methods for their preparation. All parts are by weight unless otherwise specified.

*Example 1*

A solution of 29.54 g. of methyl 2,3-isopropylidene-D-ribofuranoside and 50 cc. of pyridine was cooled in an ice bath and was then mixed with 13 cc. of methanesulfonyl chloride. It was allowed to stand in the ice bath for 30 minutes and at room temperature for 5 hours. The solution was mixed with 150 cc. of water and 50 cc. of chloroform and the layers were separated. The aqueous layer was extracted with three 30 cc. portions of chloroform and the combined extracts were washed with 20 cc. of saturated aqueous sodium bicarbonate solution followed by 20 cc. of water. The washings were back-extracted with two 15 cc. portions of chloroform and the combined organic solutions were dried and partially decolorized over magnesium sulfate and activated charcoal (Darco). The filtered solution was evaporated under reduced pressure with a small amount of toluene in order to remove the last traces of pyridine. Trituration of the product with hexane produced solid methyl 2,3-isopropylidene-5-mesyl-D-ribofuranoside which after drying in air weighed 19.6 g., M. P. 75–78° C. Further evaporation of the hexane solution yielded another 4.49 g. of this substance; M. P. 69–76° C. The combined weight of 24.1 g. represented a reaction yield of 59%. The material was recrystallized from cyclohexane-ethyl acetate; M. P. 78–79° C., $[\alpha]_D^{24}$ −53° (1.8% in chloroform). The compound is soluble in ether, chloroform and ethyl acetate. It is slightly soluble in cyclohexane and insoluble in hexane or water.

*Example 2*

A stirred suspension of 1.41 g. of methyl 2,3-isopropylidene-5-mesyl-D-ribofuranoside, 0.926 g. of potassium phthalimide, 0.1 g. of sodium iodide and 30 cc. of dimethylformamide was refluxed for 25 minutes. The cooled mixture was poured into 250 cc. of ice water and was allowed to stand for a few minutes. It was then filtered and the precipitate was washed with water and dried in air to yield 1.21 g. (73%) of methyl 2,3-isopropylidene-5-phthalimido-D-ribofuranoside, M. P. 125–126° C. Recrystallization from methanol gave large colorless crystals, M. P. 128–128.5° C., $[\alpha]_D^{24}$ −45.2° (2.5% in chloroform). The substance is soluble in methanol, chloroform, ethyl acetate and ether. It is insoluble in hexane or water.

*Example 3*

A stirred suspension of 13.4 g. of methyl 2,3-isopropylidene-5-mesyl-D-ribofuranoside, 9.26 g. of potassium phthalimide, and 100 cc. of dimethylformamide was refluxed for 15 minutes. After it had come to room temperature, it was poured into 700 cc. of water. The mixture was allowed to stand in an ice bath for 30 minutes and was then filtered. The precipitate was dissolved in 100 cc. of benzene and the solution was dried and partially decolorized with activated charcoal (Darco). Removal of the solvent in vacuo left 12.9 g. (81%) of solid methyl 2,3-isopropylidene-5-phthalimido-D-ribofuranoside which was recrystallized from methanol to afford 11.1 g. of colorless crystals, M. P. 127–128° C.

*Example 4*

A solution of 1.4 g. of methyl 2,3-isopropylidene-5-mesyl-D-ribofuranoside in 10 cc. of ethanol containing 15% ammonia (by weight) was heated in a steel bomb for 3 hours on the steam-bath. The bomb was cooled in ice, opened and the contents were evaporated under reduced pressure to 1.52 g. of residue. This was triturated with ether and from the ether solution there was obtained by evaporation 0.73 g. of starting material, M. P. 74–77° C. The ether insoluble material consisted of 0.617 g. (87% based on recovered starting material) of methyl 2,3-isopropylidene-5-amino-D-ribofuranoside methanesulfonate, M. P. 127–129° C. It could be recrystallized from cyclohexane chloroform and melted at 136–137° C.; $[\alpha]_D^{24}$ —31.9° (2% in chloroform). The substance is soluble in methanol or water, but is insoluble in ether or hexane.

*Example 5*

A solution of 1.4 g. of methyl 2,3-isopropylidene-5-mesyl-D-ribofuranoside in 15 cc. of ethanolic ammonia (saturated at 0°) was heated in a steel bomb on the steam-bath for 15 hours. The bomb was cooled in ice and opened. The contents were removed and freed from solvent under reduced pressure. The residue was thoroughly washed with ether to leave 1.45 g. (97%) of methyl 2,3-isopropylidene-5-amino-D-ribofuranoside methanesulfonate, M. P. 130–133° C.

*Example 6*

A solution of 0.3546 g. of methyl 2,3-isopropylidene-5-amino-D-ribofuranoside methanesulfonate in 100 cc. of water was stirred with 10 g. of an anion exchange resin (Amberlite IR 400) in the hydroxide form for 10 minutes and filtered. The resin was washed with 10 cc. of water and the combined filtrates were evaporated under reduced pressure. The residue was taken up in ether, and the solution after drying over magnesium sulfate was filtered and once more evaporated under reduced pressure to leave 0.1597 g. of gummy methyl 2,3-isopropylidene-5-amino-D-ribofuranoside. The substance is soluble in ether, chloroform, methanol and is somewhat soluble in water.

*Example 7*

A solution of 1.49 g. of methyl 2,3-isopropylidene-5-amino-D-ribofuranoside methanesulfonate in 60 cc. of chloroform was filtered through a layer of activated charcoal (Darco) and to the clear solution was added 2.8 cc. of triethylamine and 0.6 g. of succinic anhydride. The mixture was warmed lightly on the steam-bath for a few minutes and was then allowed to stand at room temperature for 1 hour. To this was added 0.5 cc. of ethyl chlorocarbonate and the solution was again allowed to stand at room temperature overnight. It was then washed with 20 cc. of saturated aqueous sodium bicarbonate solution and 15 cc. of water. The washings were in turn back-extracted with four cc. portions of chloroform. The combined chloroform solutions were evaporated under reduced pressure to leave 1.01 g. of gummy residue which could be crystallized from ether-methylene chloride and recrystallized from hexane-methylene chloride to yield 0.389 g. (27%) of methyl 2,3-isopropylidene-5-succinimido-D-ribofuranoside, M. P. 148–149° C.; $[\alpha]_D^{24}$ —69° (2% in chloroform). The substance is soluble in chloroform, methylene chloride or ethyl acetate. It is somewhat soluble in ether and insoluble in cold water or hexane.

*Example 8*

A solution of 0.495 g. of succinimide and of 0.27 g. of sodium methoxide in 15 cc. of absolute methanol was evaporated to dryness under reduced pressure. The residue was once more evaporated with benzene and was then dissolved in 20 cc. of dimethylformamide. The solution was mixed with 1.49 g. of methyl 2,3-isopropylidene-5-mesyl-D-ribofuranoside and was then stirred at reflux for 1 hour. The white precipitate which had formed during that time was filtered off and was washed with ether. The filtrate was mixed with 80 cc. of water and was extracted with three 30 cc. portions of chloroform and two 30 cc. portions of ethyl acetate-ether (1:1). The combined extracts were dried over magnesium sulfate, filtered and evaporated under reduced pressure. The residue was triturated with pentane to yield 0.955 g. (67%) of solid methyl 2,3-isopropylidene-5-succinimido-D-ribofuranoside, M. P. 143–151° C. The material was recrystallized three times from methylene chloride-hexane and then melted at 147–149° C.

*Example 9*

A mixture of 6.6 g. of methyl 2,3-isopropylidene-5-phthalimido-D-ribofuranoside, 75 cc. of ethanol and 75 cc. of water containing 6 cc. of 1 N hydrochloric acid was heated at reflux for 2.5 hours and was then allowed to stand at room temperature overnight. The solution was neutralized with a little sodium bicarbonate and was evaporated under reduced pressure with the bath not going over 50° C. The residue was dried by evaporation with benzene to give 5-phthalimido-D-ribose. It was taken up in 50 cc. of anhydrous pyridine and the solution was concentrated to 30 cc. under reduced pressure. To this was added 70 cc. of pyridine and 30 cc. of acetic anhydride and the mixture was allowed to stand at room temperature overnight. It was poured into 1 liter of ice water and having stood for three hours, this mixture was extracted with two 100 cc. portions of ethyl acetate and with 150 cc. of ether-ethyl acetate (2:1). The combined extracts were washed with two 50 cc. portions of water and were dried and decolorized over magnesium sulfate and Norite. The filtered solution was evaporated under reduced pressure and the residue was freed from traces of pyridine by solution in 200 cc. of ethyl acetate-ether (1:1) and washing with 70 cc. of a saturated aqueous cadmium chloride solution. The resulting precipitate was filtered off and washed with 50 cc. of ethyl acetate. The layers of the filtrate were separated and the organic solutions were combined and dried over magnesium sulfate. Evaporation of the filtered solution under reduced pressure yielded 8.4 g. of yellow syrup. This was dissolved in hot methanol and the solution was diluted with water until cloudy. Cooling caused the formation of the precipitate which was filtered off and dried under reduced pressure to give 4.15 g. (51%) of 1,2,3-triacetyl-5-phthalimido-D-ribofuranose, M. P. 80–100° C. After three recrystallizations from dilute methanol, the compound melted at 115–117° C. It is soluble in ethyl acetate, ether, chloroform and methanol, but is only very slightly soluble in water.

The original methanolic mother liquor was poured into 150 cc. of water and the milky solution was extracted with three 20 cc. portions of ethyl acetate-ether (50%). The extracts were dried and decolorized over magnesium sulfate and Norite and were then filtered and freed from solvents under reduced pressure. This left 5.43 g. of methyl 2,3-diacetyl-5-phthalimido-D-ribofuranoside. The syrup is soluble in ether, chloroform, methanol and ethyl acetate and is only slightly soluble in water.

*Example 10*

A solution of 6.6 g. of methyl 2,3-isopropylidene-5-phthalimido-D-ribofuranoside in 50 cc. of alcohol was added to 40 cc. of 0.1 N hydrochloric acid and the mixture was refluxed for 2 hours. It was then neutralized with solid sodium bicarbonate and evaporated under reduced pressure. The residue, which still contained a little water, was extracted with three 70 cc. portions of ethyl acetate-ether (1:1) and then with three 50 cc. portions of chloroform. Evaporation of the combined extracts yielded 2.2 g. (39%) of 5-phthalimido-D-ribose, M. P. 105–107° C. The solid is soluble in ethyl acetate, chloroform and methanol. It is somewhat soluble in water but insoluble in pentane.

*Example 11*

A solution of 2 g. of syrupy, methyl 2,3-diacetyl-5-phthalimido-D-ribofuranoside in 22 cc. of absolute alcohol was added to 22 cc. of water containing 5 cc. of 1 N hydrochloric acid to give a solution which was 0.1 N in acid. This was refluxed for two hours and was then evaporated to a small volume under reduced pressure. The residual solution was extracted with three 40 cc. portions of ether-ethyl acetate (1:1) solution, dried over magnesium sulfate and filtered. The filtrate was evaporated to residue under reduced pressure and the latter was dissolved in 20 cc. of pyridine and mixed with 7 cc. of acetic anhydride. This was allowed to stand overnight. The mixture was poured into 70 cc. of ice water and was then allowed to stand for 1 hour. It was extracted with three 40 cc. portions of ethyl acetate-ether (1:1) and the extracts were in turn washed with 30 cc. of water. The organic solution was dried over magnesium sulfate, filtered and evaporated under reduced pressure. Last traces of pyridine were removed by evaporation with toluene. The residue was taken up in 30 cc. of methanol and was filtered through a layer of activated charcoal and was once more evaporated to a small volume. The crystals which deposited on standing were filtered off and dried. There were obtained 0.96 g. (44%) of 1,2,3-triacetyl-5-phthalimido-D-ribofuranose, M. P. 127–129° C. The material melted at 133–135° C. after three recrystallizations from 90% methanol; $[\alpha]_D^{23}$ +2.4° (2% in chloroform). The substance is soluble in ethyl acetate, ether, chloroform and methanol but is only slightly soluble in water and insoluble in pentane.

*Example 12*

A mixture of 0.855 g. of methyl 2,3-isopropylidene-5-succinimido-D-ribofuranoside and 40 cc. of 0.06 N hydrochloric acid was heated on the steam-bath for 2 hours. The cooled solution was then stirred with 15 g. of Duolite A4 anion exchange resin in 150 cc. of water until the pH reached 5–6 (20 minutes). The resin was filtered off and washed with a total of 300 cc. of water. The filtrate was evaporated to dryness under reduced pressure and the residue was dried by evaporating it four times under reduced pressure with benzene. This left yellow gummy 5-succinimido-D-ribose which gave a strong positive Benedict's test. The substance was taken up in 25 cc. of pyridine and to the solution was added 5 cc. of acetic anhydride. The mixture was allowed to stand at room temperature for three days. It was then poured into 120 cc. of water and the solution was extracted five times with 30 cc. portions of chloroform. The extracts were, in turn, washed with 20 cc. of a saturated aqueous sodium bicarbonate solution and this was back-extracted with 10 cc. of chloroform. The combined chloroform extracts were dried over magnesium sulfate and the filtered solution was freed from the solvent under reduced pressure. The residue was evaporated three times with toluene to remove the last traces of pyridine. The gum, which remained, was taken up in ether-hexane containing just enough methylene chloride to give a clear solution. This was filtered through Darco and the colorless filtrate was evaporated under reduced pressure to afford 0.909 g. (85%) of syrupy 1,2,3-triacetyl-5-succinimido-D-ribofuranose. The substance is soluble in chloroform, ethyl acetate and alcohol. It is only slightly soluble in cold hexane or water.

*Example 13*

A mixture of 1.66 g. of methyl 2,3-isopropylidene-5-phthalimido-D-ribofuranoside, 12.5 cc. of absolute ethanol and 12.72 cc. of water containing 0.22 cc. of concentrated hydrochloric acid was heated at reflux for 2.1 hours. The solution was then cooled and stirred with Duolite A4 anion exchange resin (hydroxyl form) until neutral. The resin was removed by filtration and was washed with distilled water. The filtrate and washings were evaporated to dryness under reduced pressure and the gummy residue was dried by triple evaporation with anhydrous pyridine. The residue was then dissolved in 50 cc. of anhydrous pyridine and to the ice cold solution was added slowly 2.81 g. (2.32 cc.) of benzoyl chloride. The resulting mixture was allowed to stand at room temperature for two days. It was then poured into 300 cc. of ice water and the mixture was extracted five times with 40 cc. portions of ethylene dichloride. The combined extracts were washed once with 30 cc. of a saturated aqueous sodium bicarbonate solution and once with 20 cc. of water. The organic solution was dried over magnesium sulfate, filtered and evaporated under reduced pressure. The last traces of pyridine were removed by a triple evaporation under reduced pressure with 50 cc. portions of toluene. After drying in a vacuum desiccator the reddish gum weighed 3.0 g. It was taken up in 200 cc. of ether and the solution was decanted from a small amount of dark red material which was discarded. The ether extract was filtered through activated charcoal and the almost colorless filtrate was evaporated under reduced pressure to afford 2.63 g. of yellow residue. This was redissolved in ether and to the solution was added hexane until it became cloudy. Cooling and agitation brought down a white solid which was filtered off. The mother liquor was again diluted with more hexane to yield another portion of white solid. The combined solids were washed with a little hexane and were dried under reduced pressure to yield 1,2,3-tribenzoyl - 5 - phthalimido - D - ribofuranose; M. P. 105–111° C., the material melted at 112–114° C. after recrystallization from ether; $[\alpha]_D^{25}$ —13.4° (2.0% in 40% chloroform in ethanol). The substance is soluble in chloroform, ethyl acetate, and methylene chloride. It is somewhat soluble in warm ethanol or ether and is insoluble in water or hexane.

*Example 14*

To a solution of 2.85 grams of 1,2,3-tribenzoyl-5-phthalimido-D-ribofuranose in 8 ml. of methylene chloride was added 14.2 ml. of a 30% solution of hydrogen bromide in glacial acetic acid. The mixture was allowed to stand at room temperature for two hours. The solution containing 1-bromo-2,3-dibenzoyl-5-phthalimido-D-ribofuranose was then poured into 75 ml. of ice water. The layers were separated and the aqueous layer was extracted three times with 8 ml. portions of methylene chloride. The combined methylene chloride solutions were neutralized by careful washing with ice cold aqueous sodium bicarbonate solution. To the wet methylene chloride solution was added a mixture of 2.85 grams of silver carbonate, 23.8 ml. of acetone and 0.665 ml. of water. The resulting suspension was stirred at room temperature for one hour and was then filtered through a layer of activated charcoal (Darco). The filtrate was evaporated in vacuo and the residue was dried in a vacuum desiccator over phosphorous pentoxide to yield 1.95 grams of 2,3-dibenzoyl-5-phthalimido-D-ribose as a fluffy amorphous solid. The substance is soluble in chloroform, acetone and ethyl acetate. It is insoluble in hexane and practically insoluble in water.

*Example 15*

To a solution 1.86 grams of 2,3-dibenzoyl-5-phthalimido-D-ribose in 20 ml. of anhydrous pyridine was added 5 ml. of acetic anhydride and the mixture was allowed to stand at room temperature for fourteen hours. It was then poured into 80 ml. of ice water and the mixture was extracted with five 15 ml. portions of chloroform. The combined extracts were washed with a saturated aqueous sodium bicarbonate solution and were then dried over magnesium sulfate. The filtered solution was evaporated in vacuo. The resulting gum on trituration with ether afforded white solid 1-acetyl-2,3-dibenzoyl-5-phthalimido-D-ribofuranose which after recrystallization from ether-methylene chloride melted at 120–121° (0.427 gram). The compound is soluble in methanol, chloroform, ethyl acetate and is insoluble in water or hexane.

Example 16

To 100 ml. of a solution of hydrogen chloride in anhydrous ether (saturated at 0° C.) was added 5 g. of 1-acetyl-2,3-dibenzoyl-5-phthalimido-D-ribofuranose and the resulting solution was allowed to stand at 3° for 3 days. The solution was evaporated to dryness under reduced pressure at room temperature and the residue was freed from traces of hydrogen chloride by a triple evaporation with anhydrous benzene. The resulting 1-chloro-2,3-dibenzoyl-5-phthalimido-D-ribofuranose was obtained as a viscous gum which was used in the condensation with the chloromercuri derivative of a purine without further purification.

This application is a continuation-in-part of our application Serial No. 421,171, filed April 5, 1954, now abandoned.

We claim:

1. Compounds having the general formula:

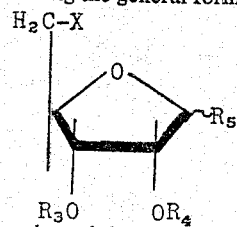

wherein X is a member of the group consisting of amino, phthalimido, succinimido, glutarimido and hexahydrophthalimido radicals, $R_3$ and $R_4$ are members of the group consisting of hydrogen, lower alkanoyl radicals, aroyl radicals and the isopropylidene radical of the formula

when $R_3$ and $R_4$ are joined together, and $R_5$ is a member of the group consisting of halogen, lower alkoxy, hydroxy, alkanoyloxy and aroyloxy radicals.

2. 1,2,3-tri-O-acyl-5-cycloimido-D-ribofuranose.
3. 1,2,3-tri-O-acetyl-5-succinimido-D-ribofuranose.
4. 1,2,3-tri-O-benzoyl-5-phthalimido-D-ribofuranose.
5. 1,2,3-tri-O-acetyl-5-phthalimido-D-ribofuranose.
6. 1-O-acetyl-2,3-di-O-benzoyl-5-cycloimido-D-ribofuranose.
7. 1-O-acetyl-2,3-di-O-benzoyl-5-phthalimido-D-ribofuranose.
8. 1-O-acetyl-2,3-di-O-benzoyl-5-succinimido-D-ribofuranose.
9. 1-halo-2,3-di-O-benzoyl-5-cycloimido-D-ribofuranose.
10. 1-halo-2,3-di-O-benzoyl-5-phthalimido-D-ribofuranose.
11. 1-chloro-2,3-di-O-benzoyl-5-phthalimido-D-ribofuranose.
12. 1-bromo-2,3-di-O-benzoyl-5-phthalimido-D-ribofuranose.
13. 2,3-di-O-benzoyl-5-cycloimido-D-ribofuranose.
14. 2,3-di-O-benzoyl-5-phthalimido-D-ribofuranose.
15. 5-cycloimido-D-ribofuranose.
16. 5-phthalimido-D-ribofuranose.
17. A method of preparing compounds having the general formula:

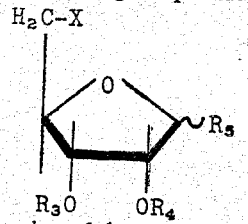

wherein X is a member of the group consisting of amino, phthalimido, succinimido, glutarimido and hexahydrophthalimido radicals, $R_3$ and $R_4$ are members of the group consisting of hydrogen, lower alkanoyl radicals, aroyl radicals and the isopropylidene radical of the formula

when $R_3$ and $R_4$ are joined together, and $R_5$ is a member of the group consisting of halogen, lower alkoxy, hydroxy, alkanoyloxy and aroyloxy radicals, which comprises subjecting a member of the group consisting of lower alkyl 2,3-O-isopropylidene-5-O-alkylsulfonyl-D-ribofuranoside and lower alkyl 2,3-O-isopropylidene-5-O-arylsulfonyl-D-ribofuranoside to ammonolysis to obtain a compound of the formula:

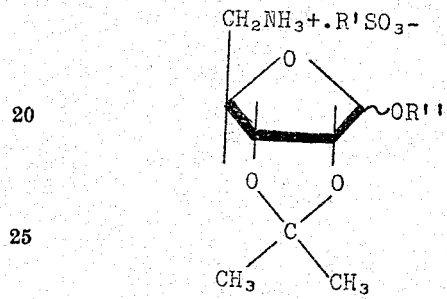

wherein R' is a member of the group consisting of alkyl and aryl radicals and R'' is a lower alkyl radical, treating said compound with a cyclic anhydride to obtain a lower alkyl 2,3-O-isopropylidene-5-cycloimido-D-ribofuranoside, hydrolyzing said latter compound with an inorganic acid to obtain a 5-cycloimido-D-ribofuranose, acylating said latter compound with a member selected from the group consisting of acetic anhydride, benzoyl chloride, propionyl chloride, propionyl anhydride, butyryl chloride, butyryl anhydride, p-nitrobenzoyl chloride and p-chlorobenzoyl chloride in the presence of an inert solvent to obtain 1,2,3-tri-O-acyl-5-cycloimido-D-ribofuranose, and treating said latter compound with a hydrogen halide in the presence of an inert solvent to produce 1-halo-2,3-di-O-acyl-5-cycloimido-D-ribofuranose.

18. A method of preparing compounds having the formula:

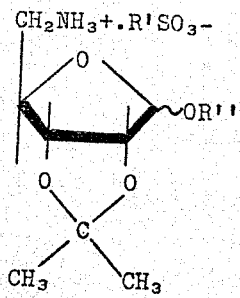

wherein R' is a member of the group consisting of alkyl and aryl radicals and R'' is a lower alkyl radical, which comprises subjecting a member of the group consisting of lower alkyl 2,3-O-isopropylidene-5-O-alkylsulfonyl-D-ribofuranoside and lower alkyl 2,3-O-isopropylidene-5-O-arylsulfonyl-D-ribofuranoside to ammonolysis.

19. A method of preparing a lower alkyl 2,3-O-isopropylidene-5-cycloimido-D-ribofuranoside which comprises subjecting a member of the group consisting of lower alkyl 2,3-O-isopropylidene-5-O-alkylsulfonyl-D-ribofuranoside and lower alkyl 2,3-O-isopropylidene-5-arylsulfonyl-D-ribofuranoside to reaction with a salt of a cyclic imide.

20. A method of preparing a 1-halo-2,3-di-O-aroyl-5-cycloimido-D-ribofuranose which comprises treating a 1-O-acyl-2,3-diaroyl-5-cycloimido-D-ribofuranose with hydrogen halide in an inert solvent.

No references cited.